United States Patent [19]

Gray

[11] 4,184,375

[45] Jan. 22, 1980

[54] PRESSURE INSTRUMENT COMPENSATING BLADDER

[75] Inventor: Tommy L. Gray, Dallas, Tex.

[73] Assignee: Span Instruments, Inc., Plano, Tex.

[21] Appl. No.: 934,701

[22] Filed: Aug. 21, 1978

[51] Int. Cl.[2] ............................................... G01L 7/00
[52] U.S. Cl. ...................................................... 73/706
[58] Field of Search ................................ 73/706, 731; 128/2.05 D, 2.05 G

[56] References Cited

U.S. PATENT DOCUMENTS

| | | | |
|---|---|---|---|
| 2,207,807 | 7/1940 | Hopkins | 73/706 |
| 2,244,335 | 6/1941 | Hopkins | 73/731 |
| 2,481,651 | 9/1949 | Fitzpatrick III | 73/706 |
| 2,881,617 | 4/1959 | Deis | 73/706 |
| 3,301,063 | 1/1967 | Kisling et al. | 73/706 |
| 3,718,046 | 2/1973 | McJones | 73/706 |
| 4,036,216 | 7/1977 | Ramsey III | 73/706 |

FOREIGN PATENT DOCUMENTS 2322454 12/1973 Fed. Rep. of Germany ............. 73/706

*Primary Examiner*—Donald O. Woodiel

*Attorney, Agent, or Firm*—Richards, Harris & Medlock

[57] ABSTRACT

A compensating bladder (30) for use in a pressure measuring device (10) for sensing pressure generated at a source. Pressure measuring device (10) includes a pressure responsive element (14) and pressure responsive structure (16) mounted within housing (12) for providing indications of pressures encountered at the source. The pressure responsive element (14) is connected by means of a socket (18), having an access opening (20), to the fluid source and for permitting pressure change to be sensed by the pressure responsive element (14). Compensating bladder (30) is disposed within the socket 18 to isolate pressure responsive element (14) from the fluid or gas entering the socket (18) and for forming a pressure transmitting chamber (66) that may be filled with a fluid. Compensating bladder (30) includes a generally longitudinal portion (44) and an integrally connected generally cylindrical portion (32). Compensating bladder (30) permits pressure changes at the source to be transferred to the chamber (66) and sensed without exposing the interior of element (14) to the fluid or gas undergoing measurement.

6 Claims, 6 Drawing Figures

PRESSURE INSTRUMENT COMPENSATING BLADDER

TECHNICAL FIELD

This invention relates to pressure measuring devices, and more particularly to a compensating bladder for isolating a measuring element from a pressure transmission fluid.

BACKGROUND ART

In order to protect the pressure responsive element of a pressure responsive instrument, such as a pressure gauge, from damage and contamination, as for example, when measuring fluids subject to freezing or corrosive or abrasive fluids, it is a common practice to impose an isolation device between the element of the pressure responsive instrument and the fluid undergoing measurement. The isolation device serves to physically separate the pressure responsive element of the instrument from the fluid being measured. Typically, isolation devices comprise pistons or diaphragms that are responsive to pressure fluctuations of the fluid undergoing measurement. Such isolation devices are described and claimed in U.S. Pat. Nos. 2,207,807 issued to Hopkins on July 16, 1940 and entitled "Pressure Responsive Indicating Apparatus"; 2,881,617 issued to Deis on Apr. 14, 1959 and entitled "Pressure Measuring Instrument"; and 3,718,046 issued to McJones on Feb. 27, 1973 and entitled "Pressure Gauge Isolator".

Such prior art isolation devices include complex structure tending to decrease the performance characteristics and reliability of instruments. Furthermore, such prior art devices have proven to be unsatisfactory when the fluid being measured undergoes wide temperature and pressure variations.

A need has thus arisen for an isolation device interposed between the pressure responsive element of a pressure responsive instrument and the fluid undergoing measurement that is simple in operation and reliable for accurately transmitting pressure from the source to the pressure responsive element. Such an isolation device should also function to isolate the pressure responsive mechanism of the instrument from the fluid undergoing measurement to prevent contamination.

DISCLOSURE OF THE INVENTION

In accordance with the present invention, a compensating bladder for transmitting pressure from a pressure source to the pressure responsive element of a pressure responsive instrument is provided.

In accordance with the present invention, a compensating bladder is provided for use with a pressure responsive instrument that responds to pressure generated at a source. The instrument includes a pressure responsive element that is responsive to changes in pressure. Connected to the pressure responsive element is an input coupling and the compensating bladder is disposed within the input coupling to isolate the pressure responsive element from the source. The compensating bladder also enables a portion of the interior of the element to be filled with a pressure transmitting fluid. The compensating bladder includes a hollow, generally elongated portion having side walls, an open end and a closed end. Further, the compensating bladder includes a generally cylindrical portion having first and second ends. The first end of the cylindrical portion is open and integrally connected to the open end of the elongated portion. The second end of the cylindrical portion is open to the source. The compensating bladder permits pressure changes at the source to be sensed by the pressure responsive element without exposing the interior of the element to the gas, such as a fluid undergoing measurement.

In accordance with a specific embodiment of the present invention, a pressure gauge includes a fitting connected to the pressure responsive element and also connected to a source of pressure to be measured. The fitting includes a bore extending therethrough and communicating with the pressure responsive element. A compensating bladder is disposed within the bore for axial movement therein and for defining a fluid chamber within the bore. The bladder and the fluid chamber isolate the pressure element from the source of pressure. Fluid is disposed within the fluid chamber and responsive to movement of the bladder for transmitting sensed pressure changes from the source to the pressure element.

BRIEF DESCRIPTION OF DRAWINGS

A more complete understanding of the invention and its advantages will be apparent from the following Detailed Description taken in conjunction with the accompanying drawings in which.

DETAILED DESCRIPTION

Figure 1:
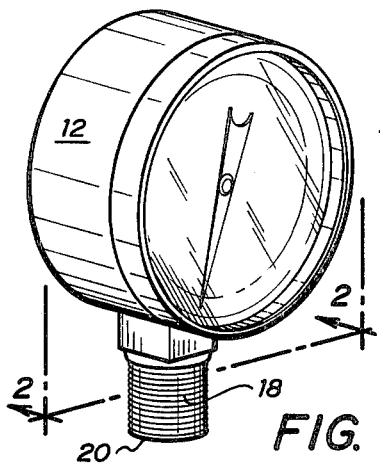
FIG. 1 is a perspective view of a pressure gauge utilizing the compensating bladder of the present invention.

FIG. 1 illustrates a conventional pressure gauge, generally identified by the numeral 10 as an example of a pressure responsive instrument. Pressure gauge 10 may comprise, for example, a conventional Bourdon-tube pressure responsive element or other pressure responsive element for driving a mechanism for indicating, recording or measuring pressure variations. As well known to those skilled in the art, a Bourdon-tube pressure responsive element consists of a flattened tube of spring bronze or steel bent into a spiral or circle. Pressure inside the Bourdon-tube tends to straighten the tube and because one end of the tube is fixed to an inlet fitting, the other end moves proportionally to the pressure difference existing between the inside and outside of the tube. This straightening motion, for example, rotates a pointer through a pinion and sector mechanism.

Figure 2:
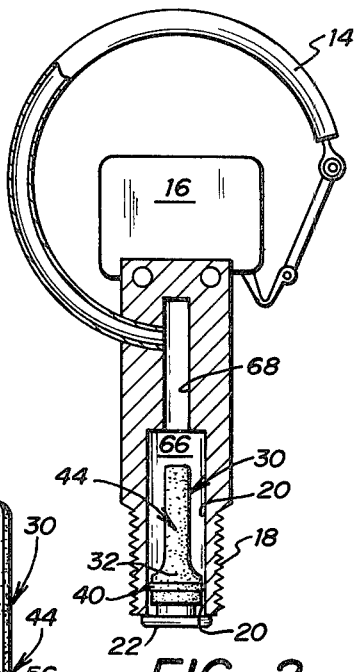
FIG. 2 is a sectional view taken generally along sectional lines 2—2 of FIG. 1 and with the external case removed.
Figure 3:
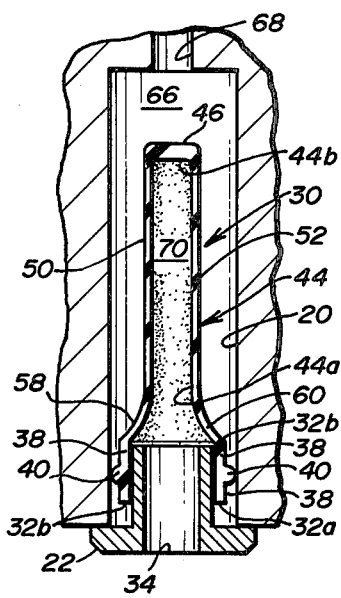
FIG. 3 is an enlarged sectional view of the compensating bladder of the present invention.
Figure 4:
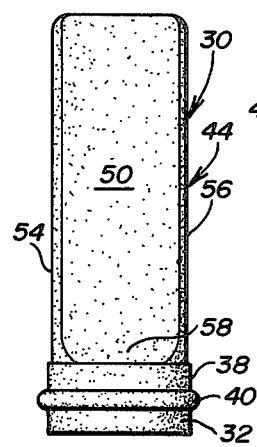
FIG. 4 is a side elevational view of the compensating bladder of the present invention.
Figure 5:
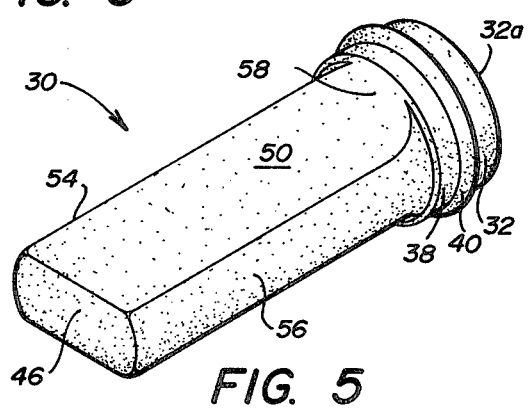
FIG. 5 is a perspective view of the compensating bladder of the present invention.

Referring simultaneously to FIGS. 1 and 2, pressure gauge 10 includes a housing 12 for containing a Bourdon-tube 14 and a motion responsive mechanism 16. Extending from the housing 12 is a screw-threaded socket 18 having an interior bore 20. Bore 20 provides an access opening into the Bourdon-tube 14 and in one embodiment of the invention includes a retainer 22.

Referring simultaneously to FIGS. 2, 3, 4 and 5 wherein like numerals are utilized for like and corresponding elements, the compensating bladder of the present invention is illustrated and is generally identified by the numeral 30. Compensating bladder 30 is formed from a thin-walled resilient material and may comprise, for example, rubber. As illustrated, the compensating bladder 30 includes a generally cylindrical portion 32 having ends 32a and 32b. Circumferentially disposed around exterior wall 38 of cylindrical portion 32 is a sealing ring 40. The sealing ring 40 functions to engage the interior walls of bore 20, such that compensating bladder 30 frictionally engages the bore in a gas-tight relationship.

Also included as a part of the compensating bladder 30 is a hollow, generally longitudinal portion, identified by the numeral 44. Longitudinal portion 44 includes an open end 44a and an end 44b closed by a wall 46. In the embodiment shown, the rectangular configuration of longitudinal portion 44 is defined by parallel side walls 50 and 52 and curvilinear side walls 54 and 56. Cylindrical portion 32 and longitudinal portion 44 are integrally joined through concave arcuate sections 58 and 60. It therefore can be seen that compensating bladder 30 is integrally formed of cylindrical portion 32 and longitudinal portion 44 interconnected by concave arcuate sections 58 and 60.

In the embodiment of the invention illustrated in FIGS. 2, 3, 4 and 5, the retainer 22 (FIG. 3) is disposed within the bore 20 interior of cylindrical portion 32. The retainer 22 functions to maintain the cylindrical configuration of cylindrical portion 32 and to maintain the sealing ring 40 in friction contact between exterior wall 38 and the interior of bore 20.

The positioning of compensating bladder 30 within bore 20 defines a chamber 66. The chamber 66 includes an aperture 68 communicating with Bourdon-tube 14 of pressure gauge 10. In the preferred embodiment, the chamber 66 contains a silicone fluid that fills the chamber 66 and Bourdon-tube 14 to transmit pressure variations applied to the compensating bladder 30 to Bourdon-tube 14.

In operation of pressure gauge 10 and the present compensating bladder 30, socket 18 may be attached directly into an opening in a wall of a pressure container or to a fluid source by means of a piping arrangement. Also, the socket 18 may be a coupling independent of the gauge 10 in the piping arrangement and containing the compensating bladder 30. Compensating bladder 30 is therefore directly exposed to the pressure from the source. A measured gas enters interior chamber 70 (FIG. 3) of compensating bladder 30 through aperture 34 in retainer 22. As the pressure varies, side walls 50, 52, 54 and 56 expand within the chamber 66. The compensating bladder is also free to move axially within the bore 20. This motion exerts pressure upon the fluid or gas contained within the chamber 66 which is caused to flow through aperture 68 to extend Bourdon-tube 14 and operate motion responsive mechanism 16. It can thus be seen that the pressure from the source is isolated from Bourdon-tube 14 by compensating bladder 30. The Bourdon-tube 14 is protected against any injurious action of the pressure transmitting medium, such as caused by freezing of the transmitting medium or a corrosive fluid. Compensating bladder 30 of the present invention further minimizes pulsations and vibration problems previously associated with some liquid-filled gauges.

Figure 6:
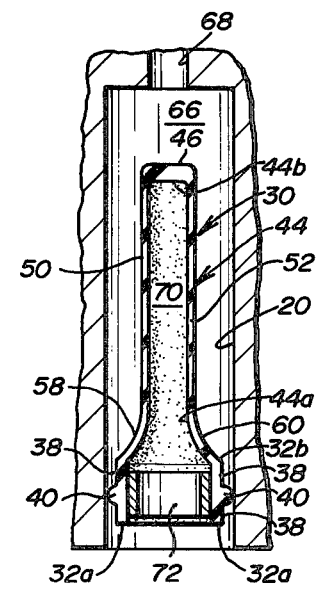
FIG. 6 is a sectional view of an alternate embodiment of the present invention.

Referring to FIG. 6, there is shown an alternate embodiment of the invention wherein a metal pressure ring 72 is inserted within the cylindrical portion 32 to maintain the sealing ring 40 in friction contact between the exterior wall 38 and the interior bore 20. In this embodiment of the invention the compensating bladder is identical to that described with reference to FIGS. 2–5. By use of the pressure ring 72 the compensating bladder 30 has additional freedom to move axially within the fluid chamber 66. However, in operation of the embodiment of FIG. 6 the primary motion of the compensating bladder 30 is the expansion of the walls 50, 52, 54 and 56 as previously explained.

It therefore can be seen that the present compensating bladder isolates a pressure responsive element from a pressure source. This isolation is provided without loss of sealing between the compensating bladder and the stem of a pressure gauge. The compensating bladder of the present invention is both reliable and economical to manufacture.

While only one embodiment of the invention has been described in detail herein and shown in the accompanying drawings, it will be evident that various further modifications are possible without departing from the scope of the invention.

I claim:

1. A compensating bladder for a pressure responsive device connected to a socket which in turn is connected to a source of pressure to be sensed comprising:
   a hollow, generally rectangular portion having a first pair of substantially flat and parallel sidewalls, a second pair of curvilinear sidewalls joining the parallel side walls and first and second ends, said first end being closed and said second end being open;
   a generally cylindrical portion having first and second ends, said first end being open and integrally joined along concave arcuate sections to said second end of said generally rectangular portion, said second end being open to the source of pressure; and
   the compensating bladder being disposed within the socket for axial movement therein in response to a pressure differential presented by the source of pressure.

2. The compensating bladder of claim 1 wherein a fluid is contained in a chamber formed within the socket between said side walls of the compensating bladder.

3. The compensating bladder of claim 1 and further including:
   sealing means disposed circumferentially around the exterior surface of said generally cylindrical portion of said compensating bladder for contacting the interior surface of the socket; and
   a sleeve disposed within said generally cylindrical portion of the compensating bladder for retaining the compensating bladder within the socket.

4. A pressure indicating device comprising:
   a pressure element responsive to pressure changes;
   a socket interconnected to said pressure element to connect said pressure element to a source of pressure to be sensed, said socket having a bore extending therethrough and communicating with said pressure element;
   bladder means disposed within said bore for axial movement therein and for defining a chamber within said bore, said bladder means and said chamber isolating said pressure element from the source of pressure, said bladder means comprising:
- a hollow, generally longitudinal portion having substantially parallel sidewalls and first and second ends, said first end being closed and said second end being open; and
- a generally cylindrical portion having first and second ends, said first end being open and integrally joined along concave arcuate sections to said second end of said longitudinal portion of said bladder means, said second end being open to the source of pressure; and
- a pressure transmitting medium disposed within said chamber responsive to movement of said bladder means for transmitting sensed pressure changes from the source of pressure to said pressure element.

5. The pressure indicating device of claim 4 and further including:
- sealing means disposed circumferentially around the exterior surface of said generally cylindrical portion of said bladder means for contacting the interior surface of said bore; and
- a sleeve disposed within said generally cylindrical portion of said bladder means for urging said rib means against the interior surface of said bore.

6. The pressure indicating device of claim 4 wherein said longitudinal portion has a generally rectangular configuration.

* * * * *